Figure 1:
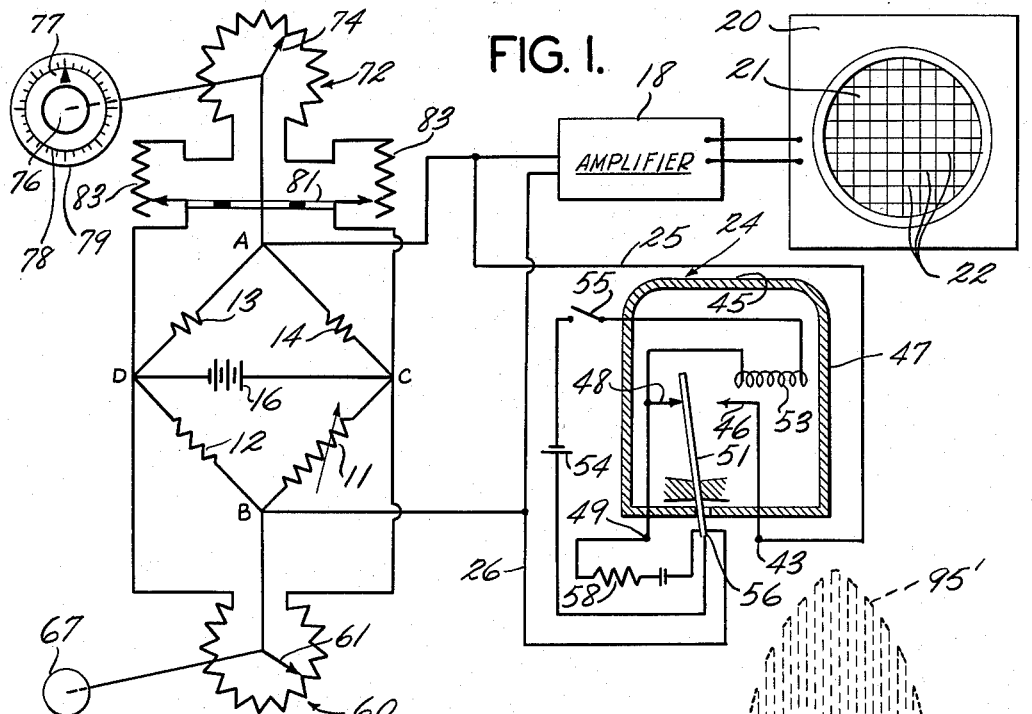

Jan. 17, 1956     G. ELLIS     2,731,583
ELECTRIC SIGNAL MEASURING APPARATUS
WITH DYNAMIC NULL BALANCE
Filed Sept. 24, 1951

INVENTOR.
Gree Ellis
BY Emery Varney
Whittemore & Dix
ATTORNEYS.

United States Patent Office 2,731,583
Patented Jan. 17, 1956

2,731,583
ELECTRIC SIGNAL MEASURING APPARATUS WITH DYNAMIC NULL BALANCE

Greer Ellis, Pelham, N. Y.

Application September 24, 1951, Serial No. 248,017

8 Claims. (Cl. 315—26)

This invention relates to test apparatus for measuring electric signals, particularly of a repetitive nature, on an oscillograph and to circuits for supplying signals to such oscillographs. Even with oscillographs having coordinate lines on their screens or faces, it is difficult to make highly accurate measurements of the strength of a signal or some significant part of a signal. One reason is non-linearity of the oscillograph trace deflection and another reason is the random undesirable movement of the oscillograph trace which occurs particularly at high sensitivity levels. Observation errors also decrease the accuracy of measurement because of the small scale of the signals.

It is an object of this invention to provide test apparatus in which the magnitude of a signal, or of some part of the signal, can be measured in a different way from the practices of the prior art. Instead of measuring the physical dimensions of the signal on the oscillograph face or a record produced by the oscillograph, this invention provides means for adjusting the level of the signals with respect to a reference signal line on the face of the oscillograph until the top, or some other significant part of the signal is at the same level as the reference line, and the amount of movement of the adjusting device indicates the magnitude of the signal.

In the preferred embodiment of the invention, the signals are produced by one or more transducers used in the arms of a bridge circuit. A chopper produces a reference line on the oscilloscope face and a potentiometer across the bridge can be adjusted to balance the bridge so that the chopped in reference line and a line of no load or zero signals are at the same level on the oscilloscope face; and to rebalance the bridge so as to shift any signal, or any part of a signal that is to be measured, to the level of the chop or reference line on the oscilloscope face. This shifting is actually a rebalancing of the bridge to compensate for the unbalance caused by the signal at the level of the signal which is brought even with the chop line, usually the top of the signal. The invention is, therefore, a dynamic null balance indicator which ordinarily is not affected in its results by characteristics of the amplifiers or by any errors in the calibration of the oscilloscope, since these affect the signals and the chop line alike at any level to which the signal line is adjusted for the null balance.

The extent of movement of the potentiometer from an original neutral position to the postion that produces a desired displacement of the signal line, to bring the part of the signal to be measured even with the chop line, is a measure of the force, or other value, represented by the signal, in accordance with a predetermined calibration of the apparatus.

The bridge circuit is preferably equipped with two potentiometers, one for obtaining the original bridge balance under no load conditions or under a known load, and the other potentiometer for measuring the signals by the extent of adjustment necessary to obtain the null balance of the chop line and the signal level.

With the conventional test equipment using oscillographs, it is necessary to use an amplitude that keeps the entire signal on the oscillograph face or on a record produced by the oscillograph in order to measure and compare its height with the height of some form of calibration signal. With this invention the calibration of the apparatus can be adjusted to give the signals enormous amplitude, and it makes no difference whether the entire signal is displayed on the oscillograph. It is merely necessary to keep on the oscillograph the tops, or other parts, of the signals that are to be measured. The chop line can always be shown on the oscillograph and the top, or other significant part, of a signal can be brought to the level of the chop line with more accuracy because of the enlarged scale of the signals. The extent of movement of the potentiometers, or other controls, is the measure of the force, displacement or other condition producing the signals.

The invention is intended primarily for use with strain gages or other transducers, but can be used to measure the amplitude of any electric signal from a generator or any other source.

Other objects, features and advantages of the invention will appear or be pointed out as the specification proceeds.

Figure 2:
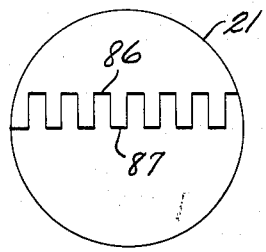
Figure 3:
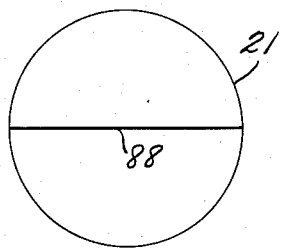
Figure 6:
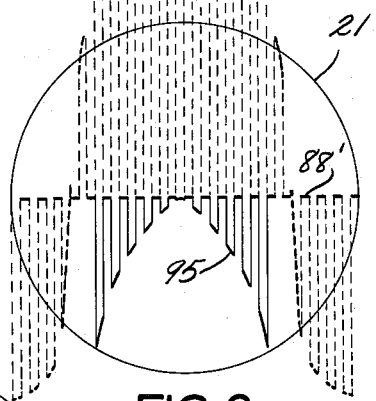
Figure 4:
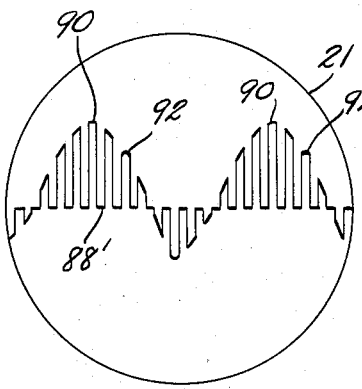
Figure 5:
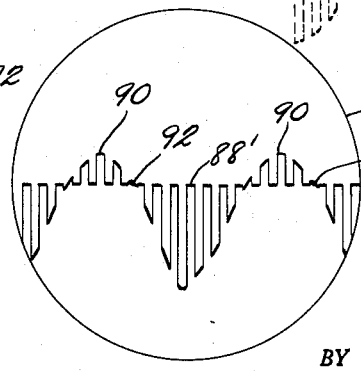

In the drawing, forming a part hereof, in which like reference characters indicate corresponding parts in all the views, Figure 1 is a diagrammatic illustration of test apparatus embodying this invention;

Figure 2 is a view showing the signals on the oscillograph face under no-load conditions and before the bridge is brought into balance, Figure 3 is a view similar to Figure 2, but showing the signals after the bridge has been brought into balance, Figure 4 shows the signals on the oscilloscope face when the bridge circuit is subject to dynamic loading, Figure 5 is a view similar to Figure 4, but showing the signals after the apparatus has been adjusted to obtain a null balance at a selected level of the dynamic signals, and Figure 6 is a view illustratiing the way in which the invention can be used with signals having amplitudes higher than the height of the oscilloscope face.

The invention includes a bridge circuit which preferably includes four arms AC; BC; BD and AD. In the embodiment illustrated, there is a transducer 11 connected in the arm BC of the bridge. This transducer is ordinarily a strain gage, but other kinds of transducers can be used. There is a ballast resistor 12 in the arm BD of the bridge, and there are preferably other resistors 13 and 14 in the arms AD and AC, respectively, of the bridge.

In some applications of the invention, the resistors 12, 13 and 14 may be variable resistors or transducers. One common application of strain gages is the location of one gage under a beam with a second transducer on top of the beam. This arrangement doubles the signal obtained in response to bending stresses since one gage is stretched while the other one compresses. In such an application, the resistor 12 would be a strain gage.

Power for the bridge is supplied by a battery 16, or other source of electric energy, connected across the terminals C and D of the bridge. The other terminals A and B of the bridge are connected through an amplifier 18 to a cathode ray oscilloscope 20. This oscilloscope 20 has a screen or face 21, and the face is shown with coordinates 22 which are ordinarily used for measuring the amplitude of signals, but which are not necessary when this invention is used in the manner intended.

A constantly repetitive switching means or vibrator 24, commonly referred to as a "chopper," is connected by conductors 25 and 26 across the output of the bridge at the terminals A and B of the bridge.

The terminal 43 connects with a fixed contact 46 in a housing 47 that encloses the vibrating portion of the chopper, and there is another fixed contact 48 in the housing with a terminal 49. A reed 51 vibrates between the contacts 46 and 48 and touches the respective contacts at opposite ends of its stroke. Motive power for the reed is supplied by a coil 53 in the circuit of the fixed contact 48 and connected outside of the vibrator housing 47 with a battery 54. There is a manually operated switch 55 in series with the battery for stopping and starting the operation of the vibrator switch.

The reed 51 has a terminal 56 at its fixed end, and this terminal is connected with the other side of the battery 54. Whenever the coil is energized, it pulls the reed 51 away from the fixed contact 48 and this breaks the circuit through the coil 53. When the coil is deenergized, the reed springs back against the contact 48, re-establishing the circuit through the coil 53 and the battery 54. The reed is thus caused to vibrate in a well known manner by the power supplied from the battery 54.

The chopper 24 opens and shorts the output of the bridge where it goes into the amplifier and oscilloscope automatically and with a predetermined controlled or regular frequency. This chopper 24 is merely representative of repetitive switch means that open and close a shorting circuit across the bridge automatically and with a predetermined frequency and in accordance with a controlled cycle of operation. When the circuit through the chopper is closed, the input to the amplifier is instantaneously reduced to zero. When the circuit through the chopper is open, the amplifier 18 is instantly supplied with the full voltage across the bridge terminals AB, including the static bridge unbalance voltage plus any dynamic signals from the transducer 11.

A balancing potentiometer 60 has an adjustable contact 61 connected to the terminal B of the bridge. The opposite ends of this first potentiometer 60 are connected with the respective terminals C and D of the bridge. The adjustable contact 61 of the potentiometer 60 is turned by a knob 67.

A second potentiometer 72 is connected across the bridge by having its opposite ends connected through resistors 83 to the respective terminals C and D; and the movable contact 74 of the second potentiometer 72 is rotated by a knob 76 which has an indicator mark 77 that moves along a scale 78 on a fixed disc 79. This knob 76 and the disc 79 with their associated markings comprise indicators for measuring the amount of adjustment of the second potentiometer 72. This second potentiometer, which will be referred to herein as the "measuring potentiometer," comprises an adjustable resistance which is connected across the bridge through a "spread" switch 81 having contacts insulated from one another and movable along resistors 83 that introduce varying and equal amount of resistance into series with the opposite ends of the measuring potentiometer 72.

The purpose of the balancing potentiometer 60, the measuring potentiometer 72 and the spread switch 81 will be explained more fully in connection with the operation of the invention to control the signals on the face of the oscilloscope 20.

If the amplifier 18 of the oscilloscope 20 is one that responds only to dynamic signals, it is necessary to modulate static signals in order to have them show on the oscilloscope face 21. This modulation is obtained by operating the chopper 24 which alternately shorts the bridge output that supplies power to the amplifier 18. When this circuit through the chopper is closed, the amplifier input is zero.

When the circuit of the chopper 24 is open, the amplifier 18 receives the normal output voltage of the bridge. The resulting trace on the oscilloscope face 21 for the initially statically unbalanced bridge is a line of square waves as shown in Figure 2. The tops of the waves coming when the chopper 24 is open produce a dash line 86 on the oscilloscope, whereas the closing of the chopper contacts produces the bottoms of the waves comprising a sash line 87 on the oscilloscope face 21. If the sweep of the oscilloscope is out of phase with the oscillations of the chopper then the lines 86 and 87 will appear to the eye as continuous lines.

The next step, when using the apparatus of this invention, is an adjustment of the balancing potentiometer 60 to bring the bridge into balance so that the signals represented by the lines 86 and 87 come closer together. When the bridge is perfectly balanced, these two lines 86 and 87 are brought into alignment to form a single continuous line 88, as shown in Figure 3.

The invention can be made with only one potentiometer, but at a sacrifice of convenience and some loss of the accuracy of adjustment.

When the transducer 11 is subject to repetitive loads, a wave 90 is formed on the oscilloscope face 21 by the signals produced when the circuit of the chopper 24 is open, but the repetitive closing of the circuit through the chopper 24 produces the chop line 88' which corresponds to the line 88 of Figure 3.

In test apparatus of the prior art the amplitude of the signal 90 was physically measured on the face of the oscilloscope by means of a separate scale or by noting the number of coordinate lines 22 (Fig. 1) over which the signal 90 extended. Such measurements could not be made with great accuracy, partly because there was an observation error which resulted from the fact that the scale of the signals was necessarily limited by the size of the oscilloscope face, partly because of non-linearity in trace deflection and partly because of up and down jitter of the signals on the face of the oscilloscope, as previously explained.

With this invention it is unnecessary to measure the signal 90 on the face of the oscilloscope. Instead of measuring the signal directly, the measuring potentiometer 72 is adjusted to rebalance the bridge and make the signal move upward or downward on the oscilloscope face until the top or any significant part of the signal is level with the chop line 88'.

For example, if there is a shoulder 92 on the signal 90, and it is desirable to measure the value represented by this shoulder, the measuring potentiometer 72 is adjusted until the signal moves downward and brings the top of the shoulder 92 even with the chop line 88'. The amount of movement of the indicator 77 around the measuring scale 78 of the disc 79 indicates the value represented by the signal at the shoulder 92. This is an instantaneous or dynamic null balance which is not ordinarily affected by characteristics of the amplifier or other characteristics of the circuit, as previously explained. The effect of jitter of the signals is minimized because the line 88' is subject to the same jitter as the signal 90.

If the full amplitude of the signal 90 is to be measured, the measure potentiometer 72 is adjusted to bring the top of the signal to the level of the chop line 88', and the adjustment necessary to produce this change in the level of the signal 90 is measured by the movement of the indicator 77 around the scale 78.

In order to obtain accurate measurements from the indicator, comprising the knob 76 and the disc 79, the spread switch 81 adds series resistance of an equal amount to each side of the measure potentiometer 72 to spread the signal measurement over a long scale length. The "spread" switch makes it possible to accommodate practically any combination of gage resistance, bridge arrangement and signal strength likely to be encountered. The spread switch 81 is preferably made so that each step of resistance added by the spread switch 81 doubles the dial space covered by a given signal. Because of the fact that the spread resistors 83 are in the original gage circuit which is seldom perfectly balanced, there will be some shift in the initial balance point on the measure disc 79 for each position of the spread switch 81. Therefore, the actual initial static balance readings should be taken on the measure dial, before applying the load, for each spread switch position that is likely to be used.

Although the circuit has been described with various resistors in it, it will be understood that for some applications other kinds of impedances can be used, and the resistors illustrated are merely representative of impedances in the circuit at various locations for effecting the operation of the circuit.

Figure 6 illustrates the way in which the invention can be used to obtain even greater accuracy by increasing the amplification. In Fig. 6 the amplifier has been adjusted to increase the amplitude of a signal 95' until the signal is so large that it can no longer be contained on the oscilloscope face 21, the size of the signal being indicated by the dotted line 95' although actually there is no such line because of the physical limits of the oscilloscope. However, the measure potentiometer can be adjusted to bring the top of the signal 95, as indicated by the dash line in Fig. 6, even with the chop line 88' and because of the greater magnification of the signals, the location of the top of the signal 95 at the exact level of the chop line can be accomplished with greater accuracy than when the signal is shown on a smaller scale on the oscilloscope face. Since the chopper cuts out portions of the dynamic signals, it is advantageous to cut out the chopper for a moment when working with each new dynamic signal so as to determine whether any significant part of the signal is occuring during the time that the oscilloscope input is short circuited by the chopper, and if necessary rephase the chopper operation to let the pertinent parts of the signal be shown during the intervals when the chopper contacts are open.

The dynamic null balance measurements can be made with the apparatus described here over a wide range of signal frequencies from zero to frequencies much higher than that of the chopper. The requirements of the amplifier for signal frequencies from zero to frequencies of the order of the chopper frequency are that the amplifier must pass a reasonably flat reproduction of the "chop" line. For signal frequencies much in excess of the chopper frequency there is the additional requirement for the amplifier that it amplifies the signal the same amount that it amplifies the "chop" line.

Calibration of the measure potentiometer 72 is usually accomplished by introducing a known static unbalance of the bridge. For example when using a resistance bridge as illustrated, the bridge is first balanced as previously explained to create an oscillograph pattern as in Figure 3; next a known resistance is paralleled to one of the bridge arms whose resistance is known and the measure knob 76 is turned until the balanced pattern of Figure 3 again appears on the oscillograph; then the effective change in bridge arm resistance is computed from the well known parallel resistance formula $$\frac{1}{R} = \frac{1}{R1} + \frac{1}{R2}$$

where R is the new effective resistance of the bridge arm circuit; R1 is the original bridge arm resistance; and R2 is the added calibration resistance.

From this computed value and the observed deflection of the knob 76 the calibration is determined.

When using a strain gage, the calibration can be accomplished directly by first balancing the bridge by means of the potentiometer 60 to obtain the pattern of Figure 3 with no load on the strain gage and with the measure potentiometer 72 set in a selected initial position. A known static load is then placed on the strain gage, and the measure potentiometer 72 is adjusted to again balance the bridge as in Figure 3.

For static or low frequency measurements a meter of sufficient sensitivity with or without an amplifier can be substituted in place of the oscillograph and amplifier in Figure 1.

The circuit can be originally balanced by bringing the meter to a null balance reading. A static or a very low frequency signal can then be measured by again bringing the meter to a null reading, by means of the measure potentiometer 72, and noting the displacement of the measure potentiometer 72 which is necessary in order to obtain the new null balance.

The preferred embodiment of this invention has been illustrated and described, but changes and modifications can be made and some features of the invention can be used alone or in different combinations.

What is claimed is:

1. A dynamic null balance indicator comprising an indicating device for variable dynamic signals, a bridge circuit from which said signals are supplied to said device, means for producing a reference signal on said indicating device, and apparatus for changing the level of the dynamic signals with respect to the reference signal to make peaks of the dynamic signals equal on the indicating device with the level of the reference signal, said apparatus including a variable impedance in the bridge circuit and a movable element that adjusts the impedance, and an indicator for showing the extent of movement of said element required to change the level of the dynamic signal with respect to the reference signal.

2. A bridge circuit for supplying signals for an oscillograph, a resistance in one arm of the bridge, a transducer in another arm of the bridge, a constantly repetitive switching means that repeatedly short circuits the output of the bridge to supply a reference line of signals, and a potentiometer with its opposite sides connected across two arms of the bridge, and with a movable contact of the potentiometer connected with the juncture of the two arms, means for adjusting the potentiometer to obtain a balance of the bridge, or to produce any desired unbalance within a predetermined range to match an unbalance produced by the transducer, and an indicator that shows the amount of adjustment of the potentiometer to obtain a given unbalance of the bridge.

3. A bridge circuit for supplying signals for an oscillograph, the bridge having two arms with impedances therein, at least one of the impedances comprising a transducer, a chopper connected across the bridge and that connects a short-circuiting conductor across the bridge when in one position to supply a reference line of signals, a potentiometer connected across both of said arms of the bridge, a movable contact of the potentiometer connected by a conductor with the juncture of said arms of the bridge, means for adjusting the potentiometer to obtain a balance of the bridge, when the chopper circuit is open, corresponding to a signal, or selected portion of a signal from the transducer, and an indicator that shows the amount of adjustment of the potentiometer required to obtain the new balance of the bridge.

4. Test apparatus for obtaining dynamic null balance indications with an oscilloscope, said apparatus including a bridge circuit having one arm containing an element from which the signals are supplied to an oscilloscope, constantly repetitive switching means connected across the bridge and movable between two positions, in one of which a short circuit is connected across the bridge to produce a reference line of signals on the oscilloscope, potentiometer means connected across the bridge and adjustable into different positions to bring the bridge into an original state of balance and subsequently into a new state of balance, corresponding to a significant level of a dynamic signal that is repeated on the oscilloscope with the short circuit switching means open, and means for adjusting the potentiometer means including devices that measure the extent of adjustment required to change the balance of the bridge from the original reference signal value to the selected level of instantaneous balance corresponding to the dynamic signals.

5. The test apparatus described in claim 4, and in which there are two potentiometers, one of which is adjustable to obtain the original balance of the bridge and the other of which is adjustable to measure an instantaneous balance point of the bridge during a dynamic signal.

6. A bridge circuit for supplying signals to an oscilloscope, said circuit including a first arm with a resistance therein, a second arm having one end connected directly to the first arm and having a transducer therein, a potentiometer connected at its opposite ends in parallel with the first and the second arms of the bridge, the connections between each end of the potentiometer and the bridge having substantially higher impedance than the potentiometer, a chopper connected across the bridge in position to periodically short circuit the bridge to produce a reference signal line on the oscilloscope, an adjustment device for changing the setting of the potentiometer, and indicators for measuring the extent of movement of the adjustment device required to rebalance the bridge and bring the reference signal line, and another signal supplied by the bridge to the oscilloscope, to a common level.

7. Electric test apparatus including an oscilloscope, an amplifier through which signals are supplied to the oscilloscope, a bridge circuit from which signals are supplied to the amplifier, consistently repetitive switching means movable into one position which closes a shunt circuit across the bridge to supply a reference line of signals to the oscilloscope, an adjustable impedance that controls the balance of the bridge to bring a selected part of a signal and the reference line of signals to a common level on the oscilloscope, a manually controlled device for changing the adjustment of the impedance, and indicators for measuring the extent of movement of the adjustable impedance to change the signals from one level to another on the oscilloscope.

8. Electric testing apparatus comprising a cathode ray oscilloscope having a face on which the ray traces a signal wave, a bridge circuit from which signals are supplied to the oscilloscope, a vibrator connected across the bridge and movable betwen two positions, in one of which the vibrator closes a shunt circuit across the bridge to produce a reference line of signals, amplifying means to make ordinary signals on the oscilloscope of greater amplitude than the height of the face of the oscilloscope, an adjustable impedance connected across the bridge and movable into different positions to control the balance of the bridge and change the relative levels of the reference line of signals and other signals on the oscilloscope face, the degree of adjustment of said adjustable impedance being sufficient to bring the reference line and a significant part of said other signals to a common level on the face of the oscilloscope regardless of the amplitude adjustment, and indicators that measure the amount of movement of the adjustable impedance required to shift the signals between any selected levels on the oscilloscope face.

References Cited in the file of this patent

UNITED STATES PATENTS

| | | |
|---|---|---|
| 2,246,575 | Coleman | June 24, 1941 |
| 2,248,581 | Norgaard | July 8, 1941 |
| 2,465,355 | Cook | Mar. 29, 1949 |
| 2,472,727 | Salinger et al. | June 7, 1949 |
| 2,489,328 | Salinger | Nov. 29, 1949 |
| 2,540,179 | Somers | Feb. 6, 1951 |
| 2,565,839 | Broadwell et al. | Aug. 28, 1951 |
| 2,588,114 | Haworth | Mar. 4, 1952 |
| 2,689,932 | Hornfeck | Sept. 21, 1954 |